US008682748B1

(12) United States Patent
Baciu et al.

(10) Patent No.: US 8,682,748 B1
(45) Date of Patent: Mar. 25, 2014

(54) SELF-SERVICE SYSTEM AND METHOD FOR USING MULTIPLE COMMUNICATION CHANNELS TO COMMUNICATE WITH A USER REGARDING A CONFLICT WITH A PRODUCT

(75) Inventors: Assaf Baciu, Berkeley, CA (US); David E. Hartig, Lafayette, CA (US); Michael G. Linnert, Menlo Park, CA (US); Kevin M. Stone, Mountain View, CA (US); Vipul Vyas, Dallas, TX (US)

(73) Assignee: Nuance Communications, Inc., Burlington, MA (US)

( * ) Notice: Subject to any disclaimer, the term of this patent is extended or adjusted under 35 U.S.C. 154(b) by 1447 days.

(21) Appl. No.: 11/411,370

(22) Filed: Apr. 26, 2006

Related U.S. Application Data

(60) Provisional application No. 60/753,224, filed on Dec. 21, 2005.

(51) Int. Cl.
*G06Q 30/00* (2012.01)
(52) U.S. Cl.
USPC .................. 705/26.7; 705/26.1; 705/26.81
(58) Field of Classification Search
USPC ......................................... 705/26, 26.1–27.2
See application file for complete search history.

(56) References Cited

U.S. PATENT DOCUMENTS

| 6,167,383 | A  | * | 12/2000 | Henson ........................ 705/26 |
| 6,363,357 | B1 | * | 3/2002  | Rosenberg et al. ............. 705/26 |
| 6,853,987 | B1 | * | 2/2005  | Cook ............................. 705/75 |
| 2002/0034940 | A1 | * | 3/2002  | Takae et al. ................ 455/418 |
| 2002/0065736 | A1 | * | 5/2002  | Willner et al. ................. 705/26 |
| 2003/0007464 | A1 | * | 1/2003  | Balani .......................... 370/310 |
| 2003/0130904 | A1 | * | 7/2003  | Katz et al. .................... 705/26 |
| 2005/0261990 | A1 | * | 11/2005 | Gocht et al. .................. 705/27 |

OTHER PUBLICATIONS

Simoudis, E. (2000). If it's not one channel, then it's another.. Bank Marketing, 32(1), 48-50+.*

* cited by examiner

*Primary Examiner* — Resha Desai
(74) *Attorney, Agent, or Firm* — Lessani Law Group, PC

(57) ABSTRACT

Self-service application and method facilitate the ability of a self-service system to resolve conflicts in an automated fashion. When a user "opts-in" to a product offer presented to the user by the self-service system, the self-service system determines if the offered product conflicts with an existing product or characteristic associated with the user's account. If there is a conflict and the conflict can be better explained in another communication channel, the self-service system informs the user that there is a problem with the user purchasing the product, and offers to provide more information via a second communication channel. If the user accepts such offer, the self-service system begins communicating with the user about the conflict in the second communication channel. In one embodiment, in transitioning to the second communication channel, the self-service system maintains the user state information.

19 Claims, 3 Drawing Sheets

SELF-SERVICE SYSTEM AND METHOD FOR USING MULTIPLE COMMUNICATION CHANNELS TO COMMUNICATE WITH A USER REGARDING A CONFLICT WITH A PRODUCT

RELATED APPLICATIONS

This application claims the benefit of U.S. Provisional Application No. 60/753,224, filed on Dec. 21, 2005, and titled "Self-Service System and Method for Using Multiple Communication Channels to Communicate with a User regarding a Conflict with a Product," the contents of which are incorporated by reference as if fully disclosed herein.

BACKGROUND OF THE INVENTION

1. Field of the Invention

This invention relates generally to self-service systems through which users can purchase products, and, more particularly, to conflict-resolution processes in self-service systems.

2. Description of the Background Art

Increasingly more and more companies are using interactive, automated self-service systems (e.g., an IVR system) to offer and sell products to customers. Automated, self-service systems, such as BeVocal's automated storefront applications, interact with users to enable the users to view, learn about, and try out product offers, as well as purchase products. Offering, previewing and selling products via an automated self-service system can increase sales and reduce the transaction costs associated with a sale (specifically, it can reduce the costs associated with live agents handling the calls). Self-service systems can interact with users via telephone, web, text and multi-media messaging, and other communication channels.

When a customer using a self-service application requests to add, cancel, or change a product, it sometimes causes a conflict with an existing product or characteristic of the user's account. Resolving the conflict often requires convincing the user to accept a different or upgraded product.

In many known self-service systems, when a conflict arises, the user is transferred to a live agent, and the live agent explains the conflict and, if applicable, explains to the user that the conflict can be resolved by the user purchasing a different or upgraded product. However, it is desirable to be able to explain the conflict (and possibly offer the user such different or upgraded product) in an automated fashion instead of always transferring the user to a live agent. Handling a conflict in an automated fashion reduces costs and may increase the chances of completing a successful transaction.

Often times, when a user is communicating with a self-service system via one communication channel, it is not practical to inform a user about a conflict or to resolve the conflict through such communication channel. For example, if a user is attempting to purchase a product using text messaging on the user's phone and a conflict arises, the user may require more information about the conflict than is practical to send via text messaging. In such case, it might be better to have the user switch over to a voice or web interface. To make the transition to another communication channel as seamless as possible for the user, it is desirable to maintain the state of the user in the first communication channel when beginning communication in the new communication channel.

Known self-service systems do not have the capability to switch communication channels to inform users of a conflict, and therefore there is a need for a self-service system with such functionality.

SUMMARY

The present invention facilitates the ability of a self-service system to resolve conflicts in an automated fashion. According to the present invention, when a user "opts-in" to a product offer presented to the user, the self-service system determines if the offered product conflicts with an existing product or characteristic associated with the user's account. If there is a conflict, the self-service system determines whether or not the conflict can be adequately explained to the user via the communication channel through which the user "opted-in" to the product offer (referred to herein as the "first communication channel"). Conflict rules entered by a developer or system administrator can be used to make such determination.

If the self-service system determines that the conflict can be better explained in a different communication channel (referred to herein as the "second communication channel"), the self-service system informs the user that there is a problem with the user purchasing the product, and offers to provide more information via the second communication channel. If the user accepts such offer, the self-service system begins communicating with the user about the conflict in the second communication channel. In transitioning to the second communication channel, the user state information is retained, thereby enabling the self-service system to commence communications in the second communication channel where or close to where the system ended communications in the first communication channel.

DETAILED DESCRIPTION OF THE PREFERRED EMBODIMENTS

1. Method for Informing a User of a Conflict Using Two or More Communication Channels The present invention enables a self-service system to use two or more communication channels to inform a user of, and possibly resolve, a conflict between (1) a product requested or inquired about by a user and (2) an existing product or characteristic associated with the user's account.

Figure 1:
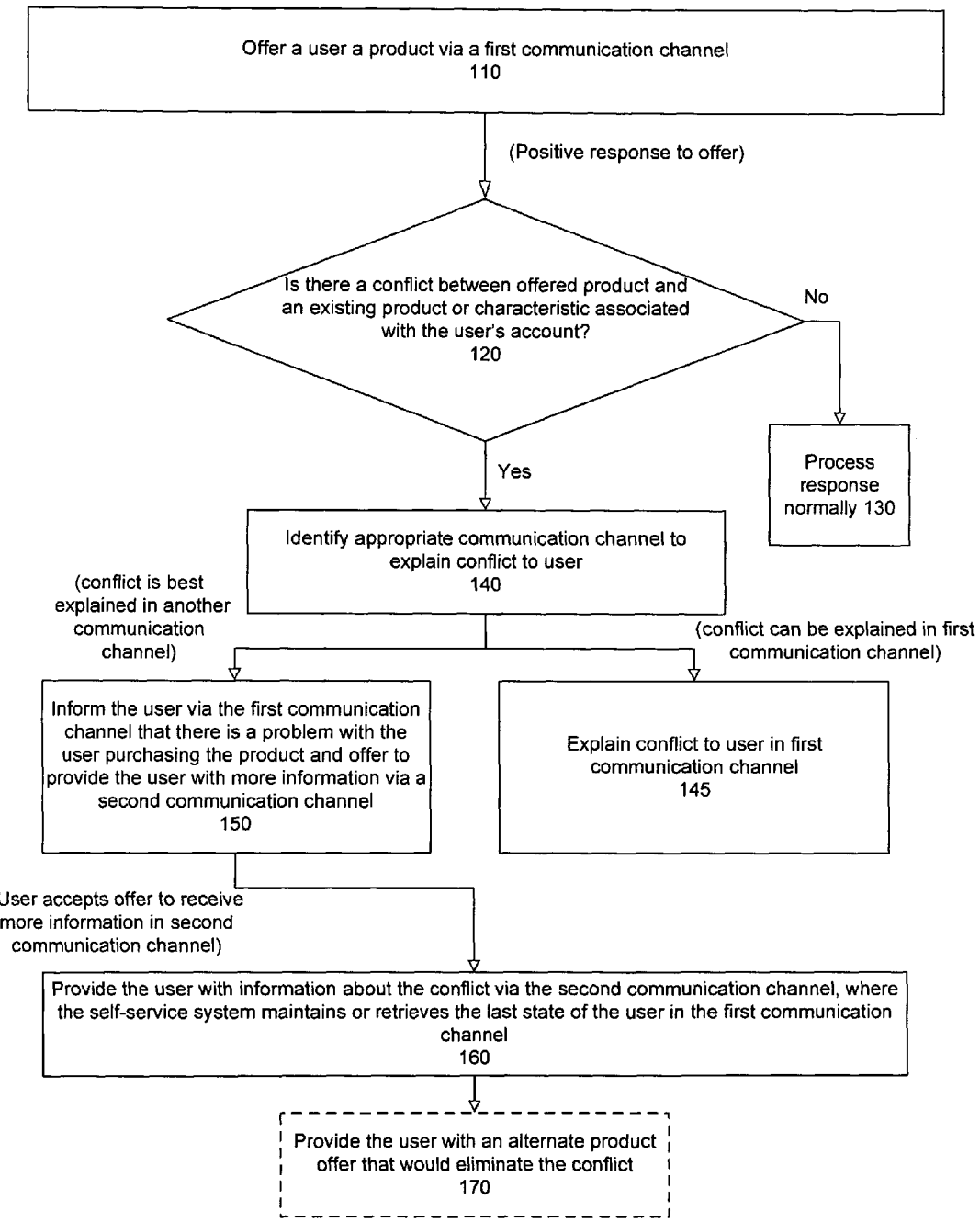
FIG. 1 illustrates a method, implemented by a self-service system, for switching communication channels to provide a user with information about a conflict.

FIG. 1 illustrates a method for detecting a conflict in one communication channel and providing the user with more information about the conflict in a second communication channel. According to such method, a self-service system offers the user a product via a first communication channel (step 110). The term "products" herein can include physical products, or, in the case of companies that offer services, "products" can include services, service plans, or other features associated with users' accounts. For example, for a wireless telecommunications company, examples of products include the rate plan a user is on and the features for which a user has signed up, such as text messaging or mobile web.

In response to receiving a positive response to the product offer, the self-service system determines whether or not there is a conflict between the offered product and an existing product or characteristic associated with the user's account (step 120). A "positive" response means the user has "opted-in" to the product offer in some way (for instance, by requesting or accepting an offer for more information about the product or accepting an offer to purchase the product).

Examples of types of conflicts include (1) the offered product overlapping in some way with an existing product and (2) the offered product being incompatible with an existing product or characteristic of the account. For instance, for a mobile phone self-service store, conflicts can arise when a requested product (e.g., a particular ring tone, or a text messaging plan, etc.) is incompatible with any of the following characteristics associated with a user's account: parental controls, age/content rating, family plan, corporate plan, rate plan, money in user's account, the user's type of phone, etc.

In response to there being no conflict, the self-service system processes the response normally (step 130). In response to there being a conflict, the self-service system identifies the appropriate communication channel through which to explain the conflict to the user (step 140). In one embodiment, such determination is made by rules set by a system administrator or developer.

If the conflict can be explained in the first communication channel, the self-service system explains the conflict to the user in the first communication channel (step 145). If the conflict would be better handled in the second communication channel, the self-service system informs the user via the first communication channel that there is a problem with the user purchasing the product and offers to provide the user with more information about the conflict via the second communication channel (step 150). In Section 2 below is an example of a way in which this offer can be presented.

In response to the user accepting the offer to receive more information about the conflict via the second communication channel, the self-service system provides the user with information about the conflict via the second communication channel (step 160). The actual communication in the second channel can be initiated be the self-service system (e.g., the system can place a call to the user) or by the user (e.g., the user can click on a link or call a number). Note that moving to the second communication channel for providing more information about the conflict does not necessarily preclude the user and the self-service system from continuing to communicate in the first communication channel for other purposes.

To enable the transition between the first communication channel and second communication channel to be as seamless as possible, the self-service system, in commencing communications in the second communication channel, maintains or retrieves the last state of the user in the first communication channel. For example, the communication system can store the user's state, or, in the case where the offer to communicate with the user in the second communication channel included a link, information about the conflict or a user's state can be embedded in such link.

In one embodiment, where the conflict can be resolved by the user accepting an alternate product offer, the self-service system attempts to resolve the conflict by providing, via the second communication channel, the alternate product offer (step 170). For instance, in a an automated storefront for a wireless telecommunications company, if a customer has a rate plan that is incompatible with a certain feature desired by the user (e.g., text messaging), then the conflict could be resolved by the user switching to a new rate plan that is compatible with the desired feature. Consequently, in such case, when the user is informed of the conflict in the second communication channel, the user can also be offered the option to upgrade his rate plan.

A method for attempting to resolve a conflict by offering the user an alternate product is described in the U.S. patent application Ser. No. 11/247,051 titled "Automated System and Method for Resolving a Conflict in a Product Order via a Voice Interface." Such application was filed on Oct. 11, 2005 with Ryan J. Bush as the inventor and is incorporated by reference as if fully disclosed herein.

The various types of communication channels that a self-service application of present invention can use to communicate with a user include, but are not limited to, voice, Internet, Short Messaging Service (SMS), Wireless Application Protocol (WAP), Java 2 Platform Micro Edition (J2ME), Binary Runtime Environment for Wireless (BREW), Multimedia Message Service (MMS), WAP Push, and Multimodal.

2. Example

Mobile Terminated SMS: You can now buy a Text messaging plan and send and receive 1000 messages for only $9.99/month. If you want to buy just reply "tm999 yes" to 47467

Mobile Originated SMS: "tm999 yes" to 47467

Mobile Terminated SMS: You are already signed up for a plan that includes text msg. We can give you a call and tell you more about your plan? Reply "tm call" and we'll call right away.

Mobile Originated SMS: "tm call" to 47467

Outbound Call to Mobile: Hello this is X wireless, we are just calling to follow up and tell you more about the plan that you are currently on. You are on the Media Basic plan, which means you already have 200 text messages per month. If you want 1000 text messages per month, then we recommend you move to media works bundle for an additional $4.99 per month . . .

3. Example Self-Service System

Figure 2:
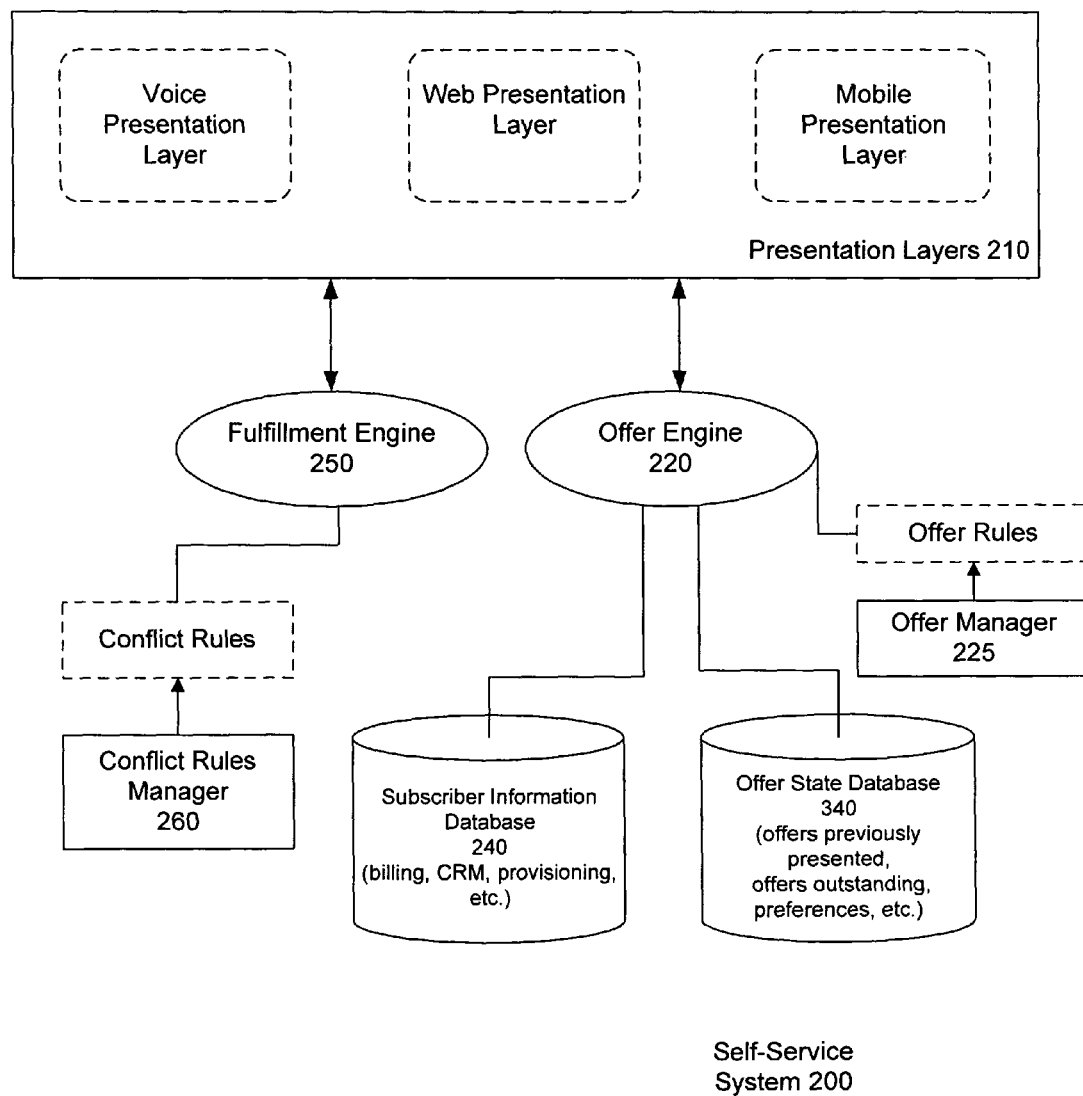
FIG. 2 illustrates an example self-service system according to one embodiment of the present invention.

FIG. 2 illustrates an example of a self-service system capable of implementing the method described with respect to FIG. 1. The Self-Service System 200 is just one example of a self-service system, and the invention is in no way limited to this example.

The Self-Service System 200 includes two or more Presentation Layers 210. A Presentation Layer 210 is a communication interface between the user and the Self-Service System 200. For instance, for voice communications, the Presentation Layer can be a VoiceXML interpreter application executing a VoiceXML document. In such case, the Presentation Layer plays audio prompts to users and recognizes spoken speech or DTMF key presses from the users. For web communications, the Presentation Layer may be a web server application. In the Self-Service System 200 illustrated in FIG. 2, there are Presentation Layers for voice communications, web communications, and mobile-device data communications (e.g., SMS, MMS WAP Push, WAP, Brew, and J2ME).

The Self-Service System 200 includes an Offer Engine 220 that presents product offers to users based on offer rules implemented by a system manager through an Offer Manager application 225. An Offer Manager application is an application that provides a user interface through which a person can enter offer rules.

Offer State Database 230, which is accessed by Offer Engine 220, stores information about (i) offers previously presented to users, (ii) current outstanding offers to users, (iii) preferences, and (iv) other offer-specific or offer state information relevant to selecting an appropriate offer for the user. Subscriber information (e.g., billing, CRM, provisioning, etc.) is stored in Subscriber Information Database 240, which is also accessed by Offer Engine 220.

The Self-Service System 200 also includes a Fulfillment Engine 250, which fulfills user product purchases. When a user "opts in" to a product offer, the Fulfillment Engine 260 determines if there is a conflict between the offered product and an existing product or characteristic associated with the user's account. The Fulfillment Engine 250 uses conflict rules to determine if there is a conflict, where conflict rules may be entered by a system administrator through a Conflict Rules Manager application 260. Conflict Rules Manager 260 is an application that provides a user interface through which a system administrator or other person can enter conflict rules. Such type of application is known in the art.

Figure 3:
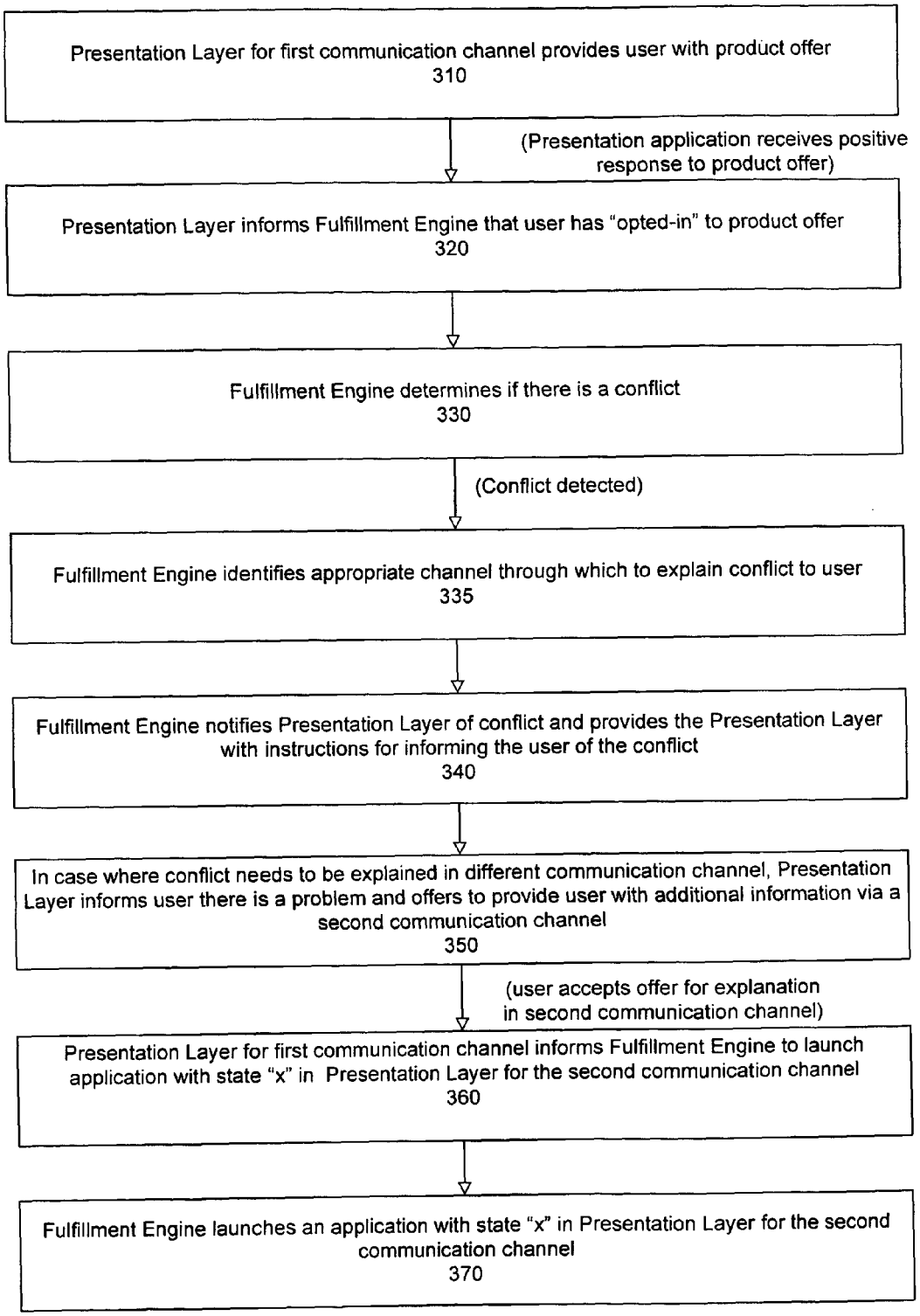
FIG. 3 illustrates a method for the self-service system of FIG. 2 to switch communication channels to provide a user with information about a conflict.

FIG. 3 illustrates an example of how the Self-Service application 200 illustrated in FIG. 2 can implement the general method described in FIG. 1. FIG. 3 is just an example of one way to implement the method described with respect to FIG. 1, and the invention is in no way limited to this example.

According to the method of FIG. 3, the Presentation Layer 210 for one communication channel (referred to as the "first communication channel") provides the user with a product offer at the direction of the Offer Engine (step 310). In response to the user "opting-in" to the offer (i.e., accepting the offer or requesting more information about it), the Presentation Layer informs the Fulfillment Engine that the user has opted-in to the offer (step 320). The Fulfillment Engine 250 then determines if there is a conflict between the offered product and an existing product or characteristic associated with the user's account (step 330). Conflict detection techniques are well known in the art. If there is a conflict, the Fulfillment Engine 250 uses the conflict rules to determine the appropriate channel through which to explain the conflict to the user (step 335). For each channel and conflict type, the applicable communication channel is specified in the conflict rules by a system administrator through the Conflict Rules Manager 260.

If a conflict is detected, the Fulfillment Engine 250 notifies the Presentation Layer of the conflict and provides the Presentation Layer with instructions for informing the user about the conflict (step 340). In the case where more information about the conflict is best provided in a different communication channel, the Presentation Layer informs (in accordance with the instructions from the Fulfillment Engine 250) the user that there is a problem and offers to provide the user with additional information via a second communication channel (step 350).

In response to the user accepting such offer, the Presentation Layer for the first communication channel informs the Fulfillment Engine 250 to launch an application in a Presentation Layer for the second communication channel with state "x", where state "x" is the current state, in the first communication channel, of the user's dialog with the Self-Service system 200 (step 360). The Fulfillment Engine 250 then launches an application with state "x" in the Presentation Layer for the second communication channel (step 370). By launching with state "x", the Self-Service Application 200 is able to immediately provide information to the user about the conflict, and any conflict-resolution proposals, thereby providing the user with a seamless experience between the communication channels.

4. Retaining State Information Across Channels in One Embodiment

In one embodiment, the rules for transitioning a user from one state to another and the actions that result are encoded in the conflict rules database 270. Storing the rules in the database allows them to be modified relatively easily by the system administrator of the Self Service System 200.

Each user session can consist of a series of applications that are launched one at a time. In one embodiment, all applications are launched using an industry standard formatted Universal Resource Identifier (URI). Embedded in the URI is not only the information about the application to be launched, but also the parameters passed to that application. In these parameters, the state of the subscriber interaction is contained.

When an applications terminates, it invokes the next application and passes it the current state of the of the user session. The input parameters together with information from the conflict rules database are used by the application to determine what information to present to the user, as well as what the next state will be, given a set of user responses.

In this way, the user's interaction is moved from application to application, each application invoking the next based on user input, and passing the state (and implicitly the user input) in the URI that invoked the application. Since nothing restricts the next application to a particular channel, the user can be moved from channel to channel as needed

5. CONCLUSION

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. An automated method performed by a self-service system for providing information about a conflict to a user using two or more communication channels, the method comprising:

offering the user a product via a first communication channel, wherein such offer is made by the self-service system;

receiving a positive response to the product offer from the user;

identifying a conflict between the offered product and an existing product or a conflict between the offered product and a characteristic associated with the user's account;

informing the user via the first communication channel that there is a problem with the user purchasing the offered product and offering, in the first communication channel, to provide the user with more information about the conflict via a second communication channel;

receiving, via the first communication channel, acceptance from the user of the offer to provide the user with more information about the conflict via a second communication channel;

passing parameters, including user state information, from the first communication channel to the second communication channel;

providing the user with information about the conflict via the second communication channel, wherein such information is provided by the self-service system, wherein user state information is retained in transitioning from the first communication channel to the second communication channel, and wherein the self-service system uses the parameters passed to the second communication channel to commence communication with the user in the second communication channel in the same state as when the conflict was detected in the first communication channel; and proposing via the second communication channel an alternate product offer, wherein the alternate product offer, if accepted, would resolve the conflict.

2. The method of claim 1, wherein the conflict is that the user has the offered product, and the alternate product offer is an upgraded product.

3. The method of claim 1, wherein the conflict is that the offered product is incompatible with the existing product in the user's account, and the alternate product offer is to replace the existing product with a new product.

4. The method of claim 1, wherein the self service system is a storefront for mobile communication products, and the conflict is that the offered product is incompatible with either a corporate plan, a family plan, or parental controls associated with a user's account.

5. The method of claim 1, wherein the self service system is a storefront for mobile communication products, and the conflict is that the offered product is incompatible with the user's type of phone.

6. The method of claim 1, wherein the conflict is that the user does not have sufficient funds in the user's account to purchase the offered product.

7. The method of claim 1, wherein one of the communication channels is a wireless voice network.

8. The method of claim 1, wherein one of the communication channels is SMS.

9. The method of claim 1, wherein one of the communication channels is MMS.

10. The method of claim 1, wherein one of the communication channels is WAP Push.

11. The method of claim 1, wherein one of the communications channels is WAP.

12. The method of claim 1, wherein one of the communication channels is the Internet.

13. The method of claim 1, wherein one of the communication channels is BREW.

14. The method of claim 1, wherein one of the communication channels is J2ME.

15. The method of claim 1, wherein one of the communication channels is Multimodal.

16. The method of claim 1, wherein the informing step also includes offering to provide the user with more information via a third communication channel, and, in response to the user accepting the offer for more information in the third communication channel, providing the user with information about the conflict in the third communication channel.

17. The method of claim 1 comprising, in addition to providing the user with information about the conflict via the second communication channel, also providing the user with a cross-sell product offer.

18. The method of claim 1 comprising, in addition to providing the user with information about the conflict via the second communication channel, also providing the user with an up-sell product offer.

19. A computer program embodied in a non-transitory tangible medium and comprising code, that when executed by a computer, causes the computer to perform the following method:

offering the user a product via a first communication channel;

receiving a positive response to the product offer from the user;

identifying a conflict between the offered product and an existing product or a conflict between the offered product and a characteristic associated with the user's account;

informing the user via the first communication channel that there is a problem with the user purchasing the offered product and offering, in the first communication channel, to provide the user with more information about the conflict via a second communication channel;

receiving, via the first communication channel, acceptance from the user of the offer to provide the user with more information about the conflict via a second communication channel;

passing parameters, including user state information, from the first communication channel to the second communication channel;

providing the user with information about the conflict via the second communication channel, wherein the computer retains user state information in transitioning from the first communication channel to the second communication channel and wherein communication with the user in the second communication channel is commenced in the same state as when the conflict was detected in the first communication channel by using the parameters passed to the second communication channel; and proposing via the second communication channel an alternate product offer, wherein the alternate product offer, if accepted, would resolve the conflict.

* * * * *